United States Patent Office 3,390,749
Patented July 2, 1968

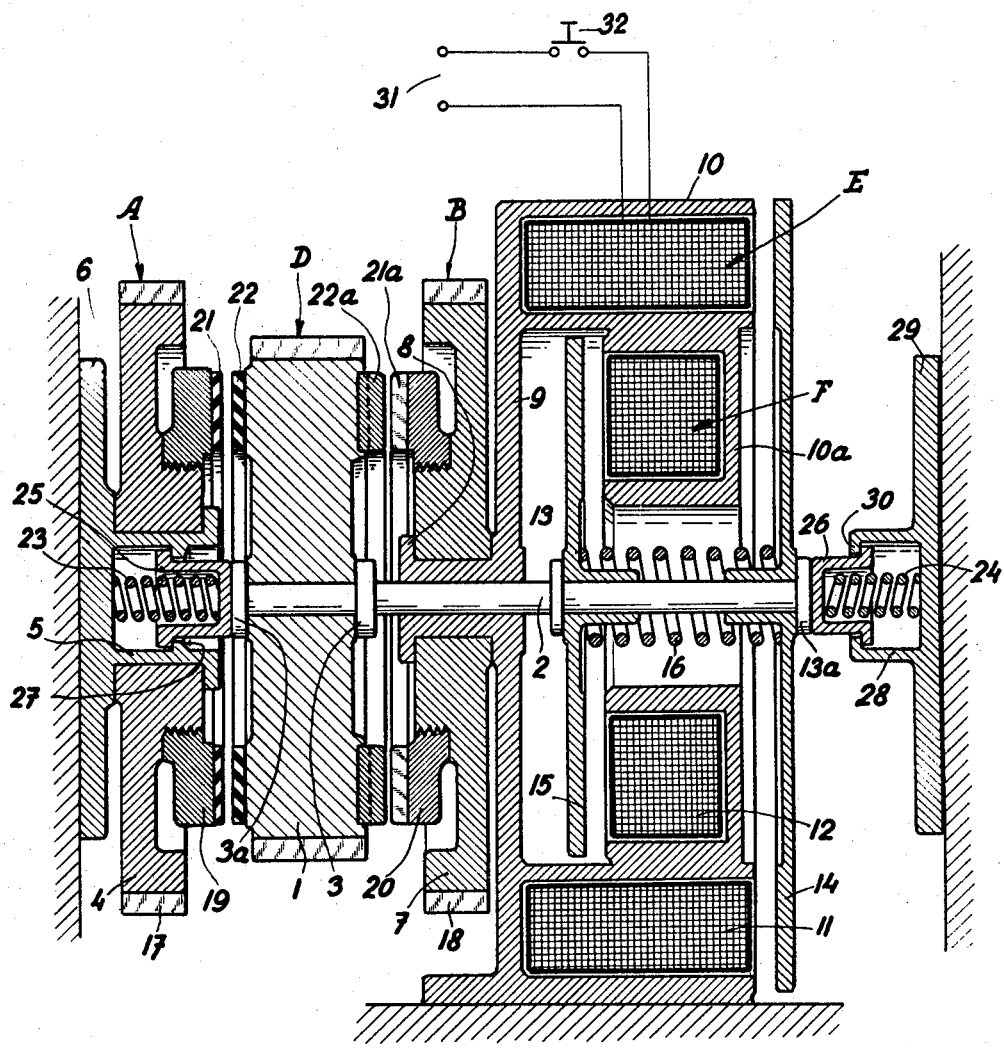

3,390,749
ELECTROMAGNETIC CLUTCH
František Pospisil and Miroslav Bouček, Usti nad Orlici, and Jiří Eliáš, Brandys nad Orlici, Czechoslovakia, assignors to Vyzkumny Ustav Bavlnarsky, Usti nad Orlici, Czechoslovakia
Filed May 16, 1966, Ser. No. 550,269
Claims priority, application Czechoslovakia, May 25, 1965, 3,395/65
15 Claims. (Cl. 192—66)

ABSTRACT OF THE DISCLOSURE

A clutch having a pair of outer clutch elements, a median clutch element received with clearance between and movable into engagement with one of the outer clutch elements at a time, and electromagnet means cooperating with the median clutch element to shift the latter into engagement with a respective one of the outer clutch elements.

---

The present invention relates to clutches in general, and more particularly to improvements in electromagnetic clutches of the type which comprise a plurality of electromagnets.

It is already known to provide an electromagnetic clutch with two driven clutch elements and a third clutch element which can be shifted into motion receiving engagement with one driven clutch element at a time. The shifting is effected by electromagnets whose coils are mounted on or in and rotate with the driven clutch elements. A serious drawback of such clutches is that the connection of coils into an electric circuit presents serious problems because the coils must receive current through a system of collectors, brushes and similar parts. Also, such conventional clutches are very bulky and their movable parts have a high moment of inertia.

Accordingly, it is an important object of the present invention to provide a very simple, compact, lightweight and highly versatile electromagnetic clutch wherein each of a plurality of electromagnets may be connected in circuit with a source of electrical energy in a very simple and reliable way.

Another object of the invention is to provide a clutch of the just outlined characteristics wherein the moment of inertia of each rotary part is very low so that the motion receiving clutch element may be rapidly arrested, accelerated to full speed and/or its direction of rotation reversed.

A further object of the invention is to provide an electromagnetic clutch wherein the coils of the electromagnets need not rotate.

An additional object of the invention is to provide an electromagnetic clutch which may be operated manually or by remote control, which can be made to transmit motion through the intermediary of jaws, teeth or friction liners, and which can be readily assembled or taken apart.

Still another object of the instant invention is to provide an electromagnetic clutch which may be used to drive a gear, a sprocket wheel or another motion receiving element in two different directions, in the same direction but at different speeds, or which can embody a suitable brake to bring the motion receiving element to a halt as soon as the latter is disengaged from the motion transmitting element of the clutch.

A further object of the invention is to provide a clutch wherein the motion receiving element automatically returns to a neutral position as soon as the coils of the electromagnets are deenergized and wherein the motion receiving element may be gradually shifted into and from motion receiving engagement with one or more driven clutch elements.

Another object of the invention is to provide an electromagnetic clutch wherein not only the coils but also the armatures of the electromagnets need not participate in rotary movements of one or more clutch elements.

Briefly stated, one feature of our invention resides in the provision of a clutch which comprises a first and a second outer clutch element, a median clutch element received with clearance between and movable into engagement with one of the outer clutch elements at a time, and first and second electromagnet means for respectively shifting the median clutch element into engagement with the first and second outer clutch elements. Each of the electromagnet means comprises a stationary coil and an armature coupled with the median clutch element. The armatures are movable in response to energization of the respective coils to thereby shift the median clutch element into engagement with the respective outer clutch element. The clutch further comprises suitable restoring means for automatically returning the median clutch element to a neutral position of disengagement from the outer clutch elements when the coils of the electromagnet means are deenergized. At least one of the outer clutch elements comprises a driven disk which can transmit rotary motion to the median clutch element in response to energization of the respective coil, and the median clutch element may comprise a pulley, a sprocket wheel or an analogous motion receiving part which can drive a link chain, an endless belt or the like.

The novel features which are considered as characteristic of the invention are set forth in particular in the appended claims. The improved electromagnetic clutch itself, however, both as to its construction and its mode of operation, together with additional features and advantages thereof, will be best understood upon perusal of the following detailed description of a specific embodiment with reference to the accompanying drawing the single illustration of which is an axial section through an electromagnetic clutch which embodies our invention.

Referring to the drawing in detail, there is shown an electromagnetic clutch which comprises five basic components, namely, two outer clutch elements A and B, a median clutch element D, and two electromagnets E and F. The outer clutch element A comprises a driven disk 4 here shown as a spur gear receiving motion from a driver gear (not shown) whose teeth mesh with the teeth 17 of the disk 4. The clutch element A further comprises a stationary hollow cylindrical hub 5 which is carried by a fixed flange 6 or another suitable support and holds the disk 4 against axial movement. The other outer clutch element B also comprises a driven disk 7 which constitutes a spur gear and is rotatable on but cannot move axially of a hollow stationary cylindrical hub 8 which is fixed to or integral with the annular flange 9 of a stationary housing 10. The teeth 18 of the disk 7 mesh with the teeth of a second driver gear, not shown. The median clutch element D comprises a disk 1 which constitutes a sprocket wheel and is rotatable on a shaft 2 provided with flanges 3, 3a serving to hold it against axial movement with reference to the disk 1. In other words, the disk 1 and shaft 2 of the median clutch element D can rotate with reference to each other but the disk 1 must share all axial movements of the shaft 2. The disk 1 can drive a suitable chain, not shown.

The electromagnet F comprises an annnular coil 12 which is mounted in a suitably configurated portion 10a of the housing 10 and a plate-like armature 15 which is axially movably supported by the shaft 2 adjacent to the outer side of the disk 7, i.e., adjacent to the outer side of the flange 9. The other electromagnet E comprises an annular coil 11 which surrounds the coil 12 and is mounted in the housing 10, and a plate-like armature 14 which is adjacent to the exposed sides of the coils 11 and 12. The armatures 14, 15 are mounted between two axially spaced washer-like annular arresting members 13, 13a of the shaft 2 and are biased against such arresting members by a relatively strong helical expansion spring 16 which is accommodated in the interior of the coil 12. The clutch further comprises restoring means tending to normally hold the disk 1 of the median clutch element D out of engagement with the clutch elements A, B. Such restoring means comprises two helical expansion springs 23, 24 and two cupped spring retainers 25, 26. The spring 23 operates between the support 6 and the bottom wall of the retainer 25 and urges the latter against the left-hand end face of the shaft 2. The spring 24 operates between a stationary support 29 and the bottom wall of the retainer 26 and urges the latter against the right-hand end face of the shaft 2. It will be seen that the retainers 25, 26 are provided with outwardly extending annular flanges which can move into abutment with inwardly extending annular stops 27, 30 respectively provided in the hub 5 and in a similar tubular member 28 mounted on the support 29. These stops 27 and 30 limit axial movements of the shaft 2 and disk 1 under the bias of the restoring springs 23, 24.

The left-hand disk 4 comprises a motion transmitting portion 19 which includes a nut meshing with the remainder of the disk 4 and an annular friction liner 21 engageable by a complementary motion transmitting friction liner 22 on the left-hand end face of the disk 1. The nut of the motion transmitting portion 19 will be rotated if the operator desires to adjust the clearance between the disks 1 and 4. The disk 7 carriers a motion transmitting portion 20 which also includes a nut and a set of jaws or claws 21a engageable by complementary motion transmitting claws 22a provided on the right-hand end face of the disk 1. It is clear that the clutch also comprises suitable means for locking the nuts of the motion transmitting portions 19 and 20 in selected positions of adjustment. It is further clear that the transmission of motion between the disks 1, 4 and 7 can take place solely by means of teeth or jaws, solely by means of friction liners, or that the position of the motion transmitting portions 21, 22 and 20, 22a may be reversed without departing from the spirit of our invention.

The circuit of the outer coil 11 comprises a source 31 of electrical energy and a master switch 32. The circuit of the coil 12 is similar.

It is now assumed that the disks 4 and 7 are driven in opposite directions by the aforementioned driver gears (not shown) whose teeth respectively mesh with the teeth 17 and 18 of the disks 4 and 7. The nuts of the motion transmitting portions 19 and 20 are adjusted in such a way that the springs 23, 24 can maintain the median disk 1 in a neutral position in which the median disk is located exactly or substantially midway between the disks 4 and 7, i.e., that the disk 1 is received between the disks 4 and 7 with at least some clearance. If the operator thereupon decides that the disk 1 should rotate in a first direction, he closes the master switch 32 to energize the coil 11 whereby the latter attracts the armature 14 so that the shaft 2 moves to the left under the bias of the spring 16. The spring 23 is compressed and the flange 3 compels the disk 1 to engage the disk 4. More particularly, the friction liner 22 will engage the liner 21 of the motion transmitting portion 19 so that the disk 1 is compelled to share all rotary movements of the disk 4. During such leftward axial displacement of the shaft 2, the spring 16 continuously urges the armature 15 against the arresting member 13 so that the armature 15 moves away from the associated coil 12.

If the disk 1 is to be brought to a halt, the operator opens the master switch 32 to deenergize the coil 11. The spring 23 then expands and pushes the shaft 2 back to neutral position which is shown in the drawing. By completing the circuit of the coil 12, the operator can cause the coil 12 to attract the armature 15 so that the shaft 2 moves in a direction to the right and causes the jaws 22a to engage the jaws 21a of the motion transmitting portion 20 on the right-hand disk 7. The disk 1 is then compelled to rotate with the disk 7.

The clutch of our invention may be used with equal advantage for driving the disk 1 at different speeds. This will be readily understood because the disk 1 will rotate at a first speed in response to engagement with the disk 4 and at a second speed if it is caused to engage the disk 7 provided, of course, that the disks 4 and 7 are driven in the same direction but at different speeds.

Furthermore, the structure shown in the drawing may be used as a combination clutch and brake if the disk of one of the outer clutch elements A, B is fixedly secured to its hub or if one of the disks 4, 7 is held against rotation on the hub 5 or 8 by a separate braking device. For example, if the disk 4 is a fixed brake disk, the disk 1 will be brought to a halt as soon as the operator completes the circuit of the outer coil 11.

The two coils 11, 12 need not surround each other, i.e., it is equally possible to place these coils adjacent to each other. However, the embodiment which is actually shown in the drawing was found to be especially suited for many uses because its component parts occupy very little room.

The master switches of the electromagnets E and F may be opened and closed by an automatic programming unit, not shown, or by remote control through a system of Bowden wires or the like. Also, the disks 4 and 7 may constitute friction wheels, i.e., the teeth 17, 18 of these disks may be replaced by friction liners which engage suitable driver wheels. The disk 1 can be replaced by a pulley to drive an endless belt or the like.

Some clearance between the disks 1, 4 and 7 will be necessary in neutral position of the disk 1 if the motion transmitting portions 19, 20, 22 and 22a are provided with jaws or teeth. The spring 16 insures that the engagement between such motion transmitting portions is gradual, i.e., that the jaws or teeth will not clash when the shaft 2 is caused to leave its neutral position.

A very important advantage of our improved clutch is that it occupies very little room and also that the electromagnets E and F may be connected in an electric circuit in a very simple and inexpensive way. This is due to the fact that the coils 11, 12 are stationary so that such coils can receive current without resorting to rings, collectors and similar complicated components. The clutch is of lightweight construction so that its rotary parts have low moments of inertia and the direction of rotation of the median clutch element D can be changed with little loss in time. All parts of the clutch may be readily taken apart or reassembled, and the dynamic balance of the clutch has been found to be exceptionally satisfactory.

Finally, it is equally clear that the disk 1 of the median clutch element D may be driven at all times and then serves to drive the clutch element A or B at a given speed. Each of the clutch elements A, B may operate a separate unit of a machine tool or the like.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. A clutch comprising a first and a second outer clutch element; a median clutch element including a disk and a shaft axially movable with said disk and extending through one of said outer clutch elements; and first and second electromagnet means for respectively shifting said median clutch element into engagement with said first and second outer clutch elements, each of said electromagnet means comprising a stationary coil and an armature mounted on said shaft and coupled with said median clutch element, said armatures being movable in response to energization of the respective coil to thereby shift said median clutch element into engagement with a respective one of said outer clutch elements.

2. A clutch as set forth in claim 1, wherein the disk of said median clutch element is rotatable on said shaft.

3. A clutch as set forth in claim 1, wherein each of said outer clutch elements comprises a driven disk and wherein said disks rotate in opposite directions, said disk of said median clutch element being coaxial with and is shiftable axially into and away from motion receiving engagement with the disks of said outer clutch elements.

4. A clutch as set forth in claim 1, wherein each of said outer clutch elements comprises a stationary hub and a disk rotatably mounted on the respective hub.

5. A clutch as set forth in claim 1, wherein said coils are outwardly adjacent to one of said outer clutch elements.

6. A clutch as set forth in claim 5, wherein one of said coils surrounds the other coil.

7. A clutch as set forth in claim 1, wherein each of said outer clutch elements also comprises a disk and wherein said disks have a common axis.

8. A clutch as set forth in claim 7, wherein the disk of at least one of said outer clutch elements is driven and the disk of said median clutch element is shiftable axially between the disks of said outer clutch elements and receives rotary motion when engaging said driven disk.

9. A clutch as set forth in claim 7, and further comprising restoring means acting upon said shaft to maintain the disk of said median clutch element out of engagement with the disks of said outer clutch elements when said coils are deenergized.

10. A clutch as set forth in claim 9, wherein said restoring means comprises a pair of resilient elements.

11. A clutch as set forth in claim 9, further comprising fixed stop means for restricting axial movements of said shaft.

12. A clutch as set forth in claim 9, wherein said shaft comprises portions extending axially through said outer clutch elements and said restoring means comprises a pair of springs operating against spring retainers provided at the axial ends of said shaft, and further comprising a pair of stationary stop means for limiting the movement of said retainers in response to bias of the respective springs.

13. A clutch as set forth in claim 1, wherein each of said armatures being axially movably supported by said shaft.

14. A clutch as set forth in claim 13, wherein said shaft comprises a pair of axially spaced arresting members and said armatures are disposed between said arresting members, and further comprising resilient means for biasing each of said armatures against one of said arresting members.

15. A clutch as set forth in claim 14, wherein said arresting members are outwardly adjacent to said one outer clutch element and one of said coils is disposed between said armatures.

References Cited
UNITED STATES PATENTS

| | | |
|---|---|---|
| 1,814,424 | 7/1931 | Barr. |
| 2,595,190 | 4/1952 | Edwards. |
| 2,605,877 | 8/1952 | Winther. |
| 2,642,169 | 6/1953 | Hutchison _ _ _ _ _ _ _ _ _ _ _ 192—40 |
| 2,848,085 | 8/1958 | Mannaioni _ _ _ _ _ _ _ _ _ 192—18.2 |
| 2,860,748 | 11/1958 | Turner. |

FOREIGN PATENTS

| | | |
|---|---|---|
| 625,628 | 8/1961 | Canada. |

MARTIN P. SCHWADRON, *Primary Examiner.*

MARK NEWMAN, *Examiner.*

C. M. LEEDOM, *Assistant Examiner.*